E. W. BONFIELD & J. E. FELLOWS.
MACHINE FOR MAKING CARDBOARD BLANKS.
APPLICATION FILED JULY 31, 1909.
993,749.
Patented May 30, 1911.
7 SHEETS—SHEET 1.
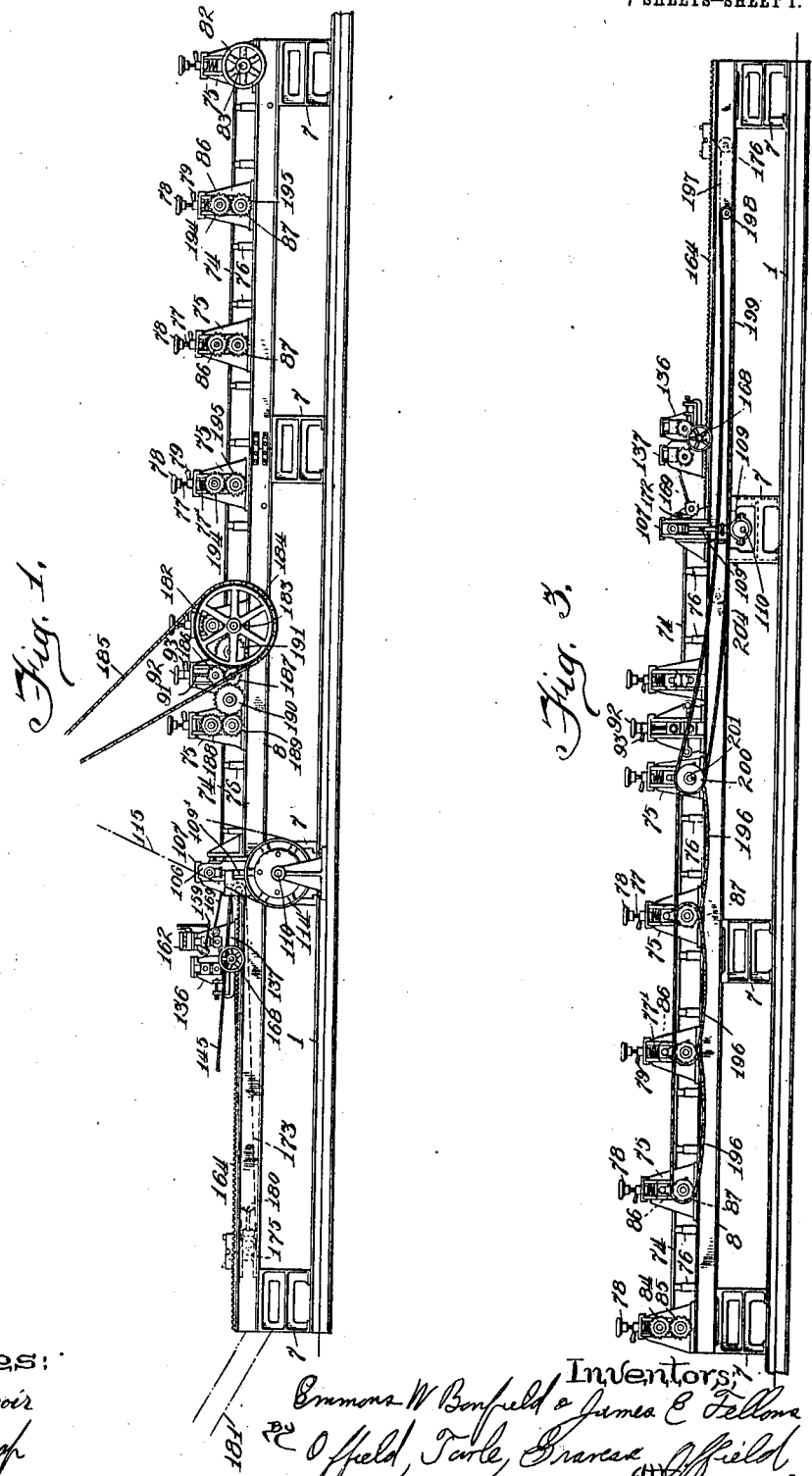

E. W. BONFIELD & J. E. FELLOWS.
MACHINE FOR MAKING CARDBOARD BLANKS.
APPLICATION FILED JULY 31, 1909.
993,749.
Patented May 30, 1911.
7 SHEETS—SHEET 2.
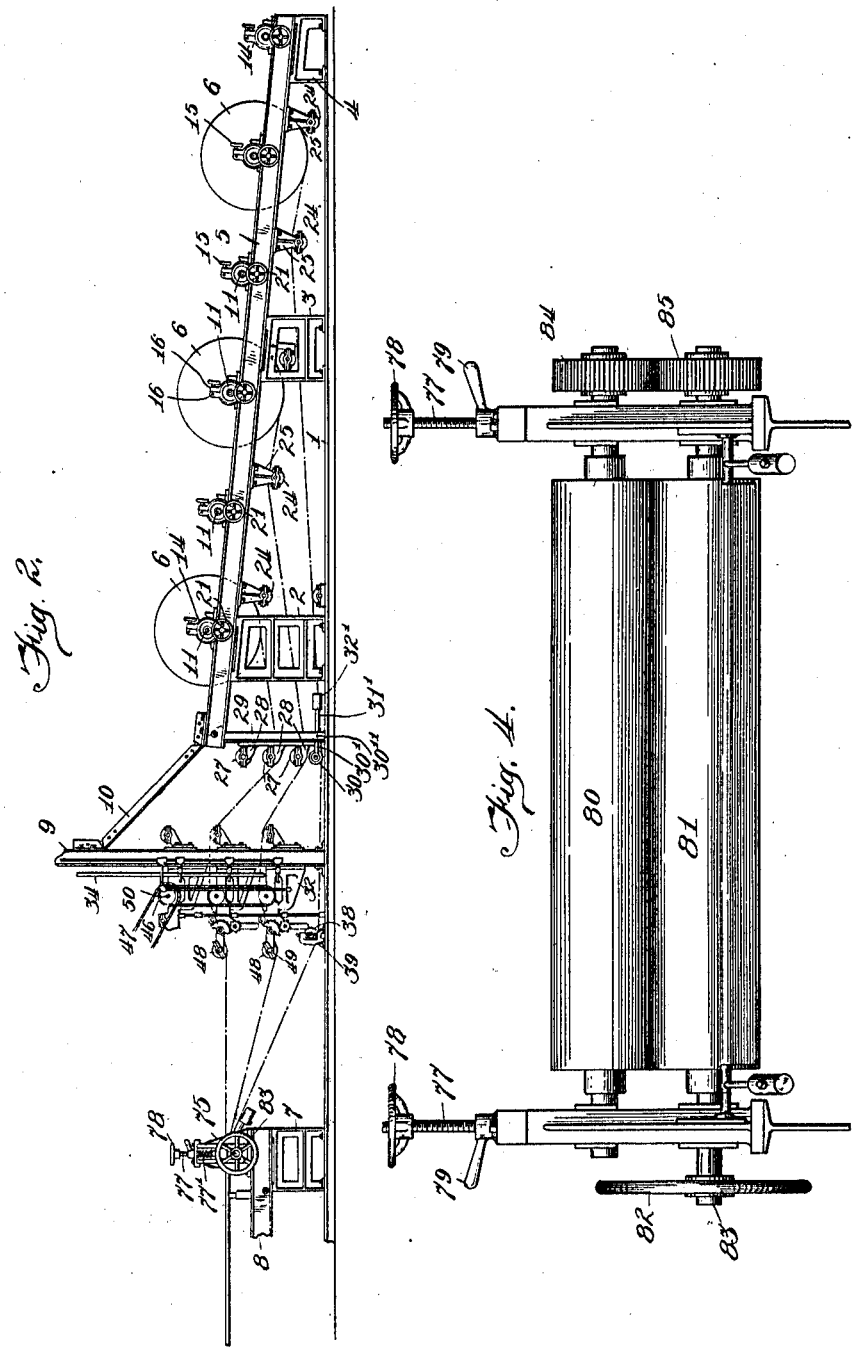

E. W. BONFIELD & J. E. FELLOWS.
MACHINE FOR MAKING CARDBOARD BLANKS.
APPLICATION FILED JULY 31, 1909.
993,749.
Patented May 30, 1911.
7 SHEETS—SHEET 3.
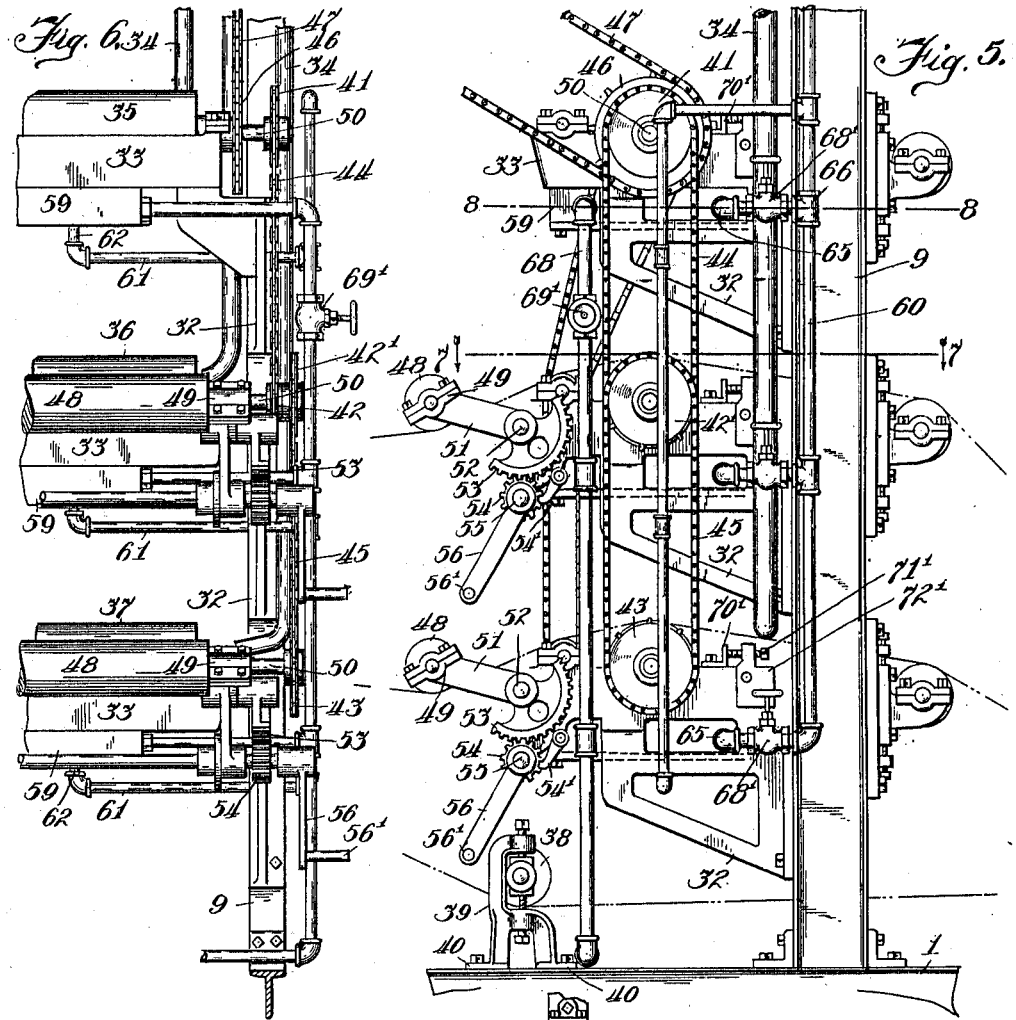
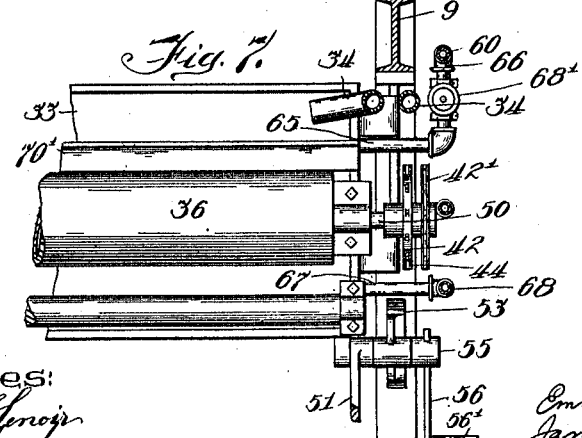

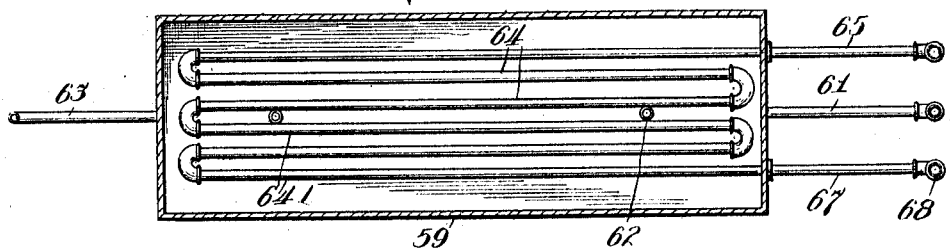
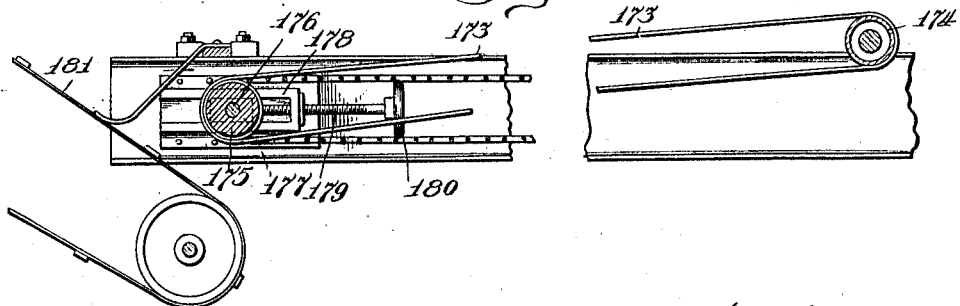
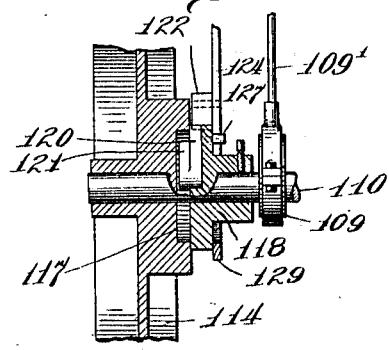
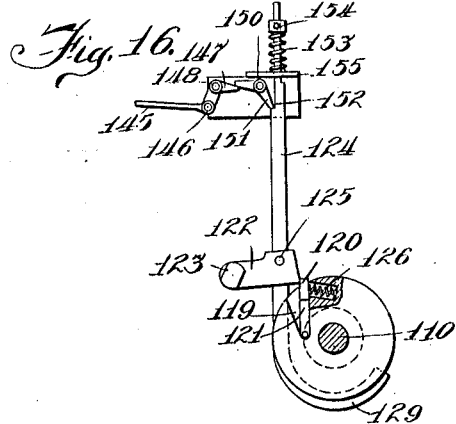

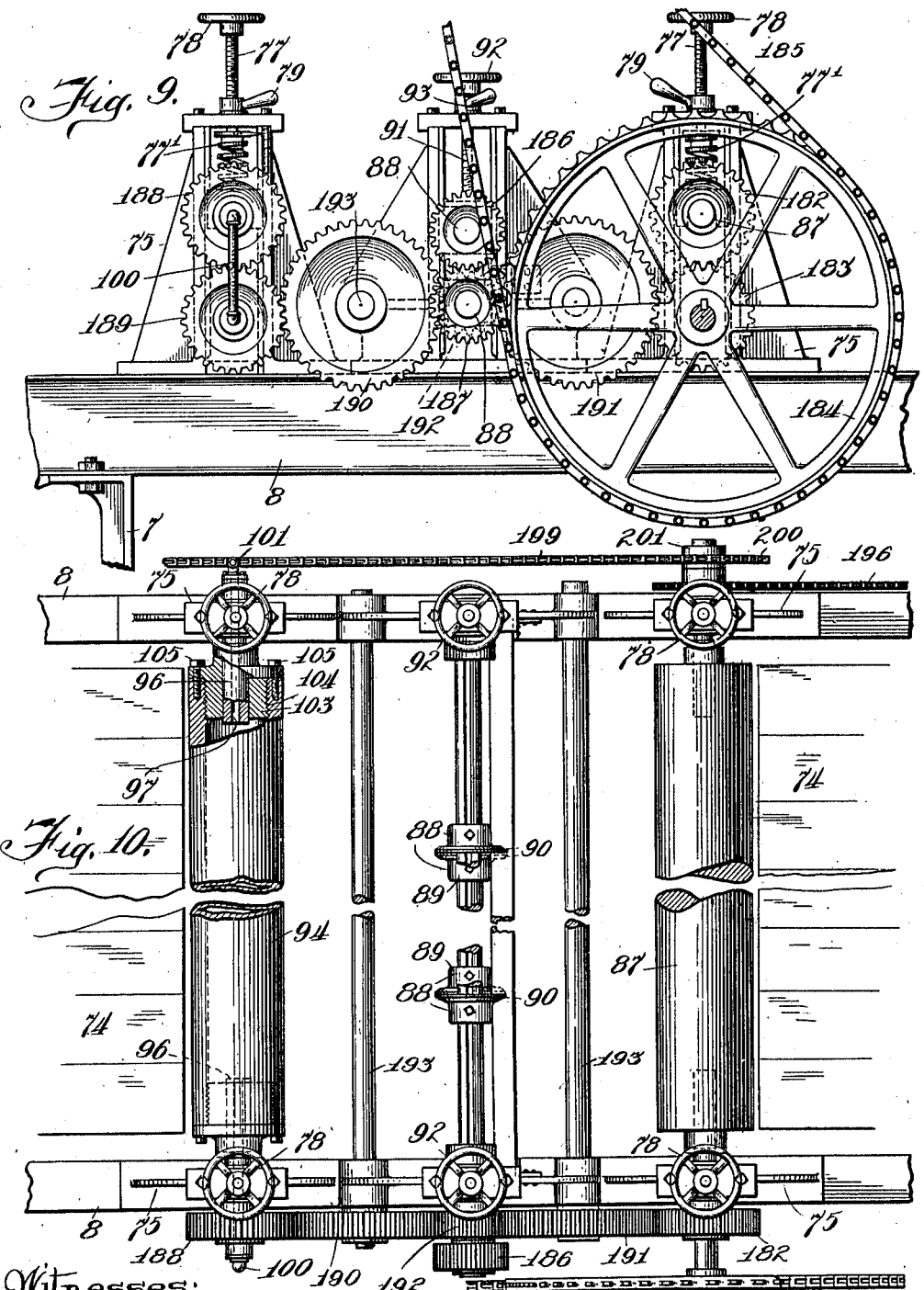

E. W. BONFIELD & J. E. FELLOWS.
MACHINE FOR MAKING CARDBOARD BLANKS.
APPLICATION FILED JULY 31, 1909.
993,749.
Patented May 30, 1911.
7 SHEETS—SHEET 6.
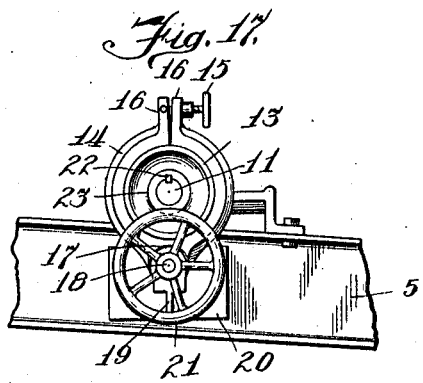
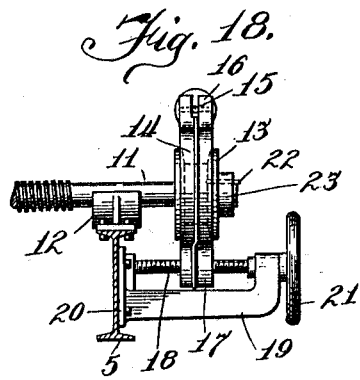
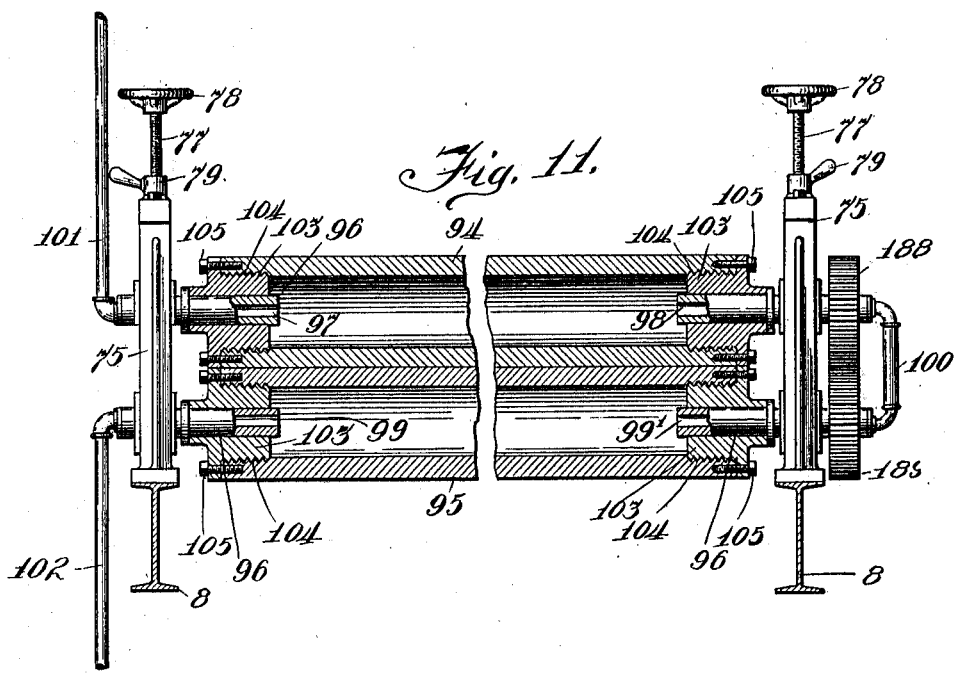

E. W. BONFIELD & J. E. FELLOWS.
MACHINE FOR MAKING CARDBOARD BLANKS.
APPLICATION FILED JULY 31, 1909.
993,749.
Patented May 30, 1911.
7 SHEETS—SHEET 7.
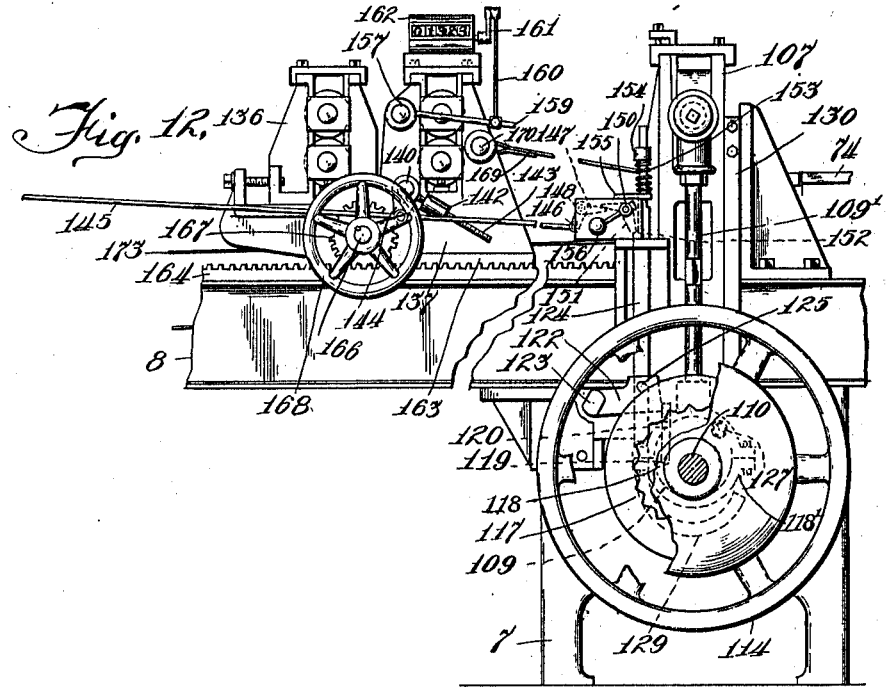
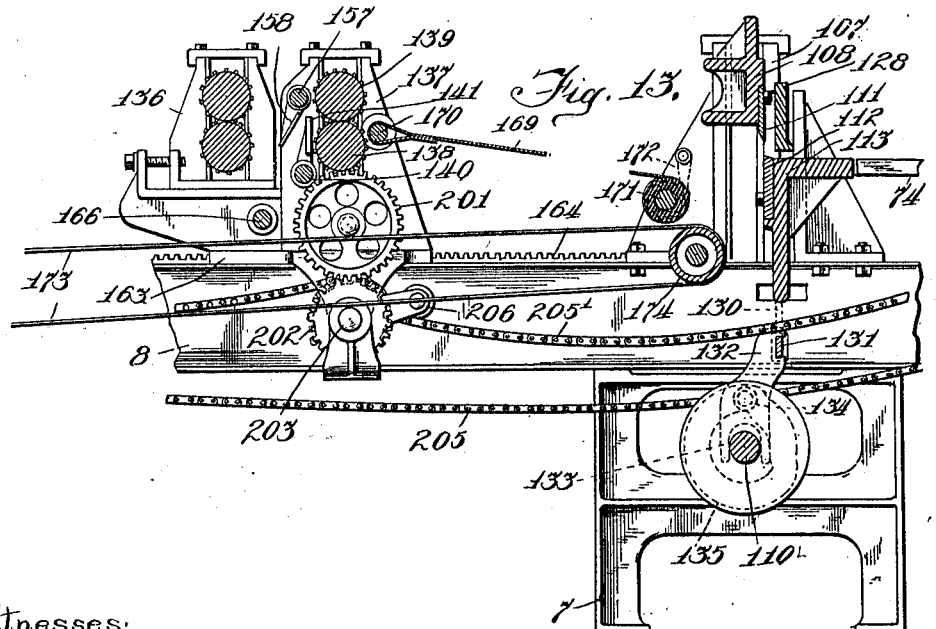

UNITED STATES PATENT OFFICE.

EMMONS W. BONFIELD, OF EVANSTON, AND JAMES E. FELLOWS, OF CHICAGO, ILLINOIS.

MACHINE FOR MAKING CARDBOARD BLANKS.

993,749.  Specification of Letters Patent.  Patented May 30, 1911.

Application filed July 31, 1909. Serial No. 510,517.

*To all whom it may concern:*

Be it known that we, EMMONS W. BONFIELD and JAMES E. FELLOWS, citizens of the United States, residing, respectively, in the cities of Evanston and Chicago, county of Cook, and State of Illinois, have invented certain new and useful Improvements in Machines for Making Cardboard Blanks, of which the following is a specification.

This invention relates to improvements in machines for making card-board blanks and refers more particularly to a machine for assembling and gluing together a plurality of webs of card-board and thereafter automatically cutting the same into blanks of any desired length.

Among the salient objects of the invention are to provide in a machine of the character referred to an improved construction for superposing, pasting and gluing together a plurality of webs, conveying the same to a slitting and shearing mechanism, and then delivering the completed and severed blanks to any suitable conveyer mechanism; to provide a construction in which the above operations may be carried on automatically and continuously, and substantially without any manual coöperation; to provide a construction the various operating parts of which are adjustable in order to vary the character and size of the blanks, and also to allow for wear or any inaccuracies in manufacture or assembling; to provide an improved arrangement for mounting the supply rolls whereby the blanks may be formed of any desired number of ply; to provide a construction in which the supply rolls are so arranged that stock varying in character, as in texture, color, etc., may be fed from the same machine without necessitating the removal of the stock not in use; to provide improved means for mounting the supply rolls in order to permit longitudinal adjustment of the same; to provide in a construction of the character referred to improved means for tripping the shearing mechanism and in which the former is controlled or actuated by the advancing blanks themselves, thus insuring the severing of the later at the proper time; to provide a construction which can be adapted to automatically cut blanks of any given size by merely bodily shifting certain movable parts; to provide improved means in guiding the blanks from the shearing mechanism to the suitable rolls; to provide means for automatically conveying away the severed blanks as they are delivered from the snatch rolls; to provide a simple tallying mechanism for counting the number of blanks; to provide a construction in which the various operating parts may be repaired or replaced without disturbing any of the other mechanism; and in general to provide an improved construction of the character referred to.

The invention consists in the matters hereinafter described and more particularly pointed out in the appended claims.

In the drawings—Figures 1 and 2 taken together represent a side elevation of the machine. Fig. 3 is a side elevation of the front end of the opposite side of the machine, and showing more particularly the manner of driving the various rolls. Fig. 4 is a rear end elevation of the gathering rolls and showing the scraper mechanism. Fig. 5 is a side elevation of the paste applying mechanism. Fig. 6 is a fragmentary front end elevation of the same. Fig. 7 is a fragmentary horizontal sectional view taken approximately on lines 7—7 of Fig. 5 and looking downwardly. Fig. 8 is a horizontal sectional view taken approximately on line 8—8 of Fig. 5 and showing more particularly the arrangement of the steam pipes by which the fountains are heated. Fig. 9 is a side elevation of a portion of the machine shown in Fig. 1 and showing the manner of driving the feed and slitting rolls. Fig. 10 is a top plan view, partly in section of that portion of the machine shown in Fig. 9, parts, however, being broken away to reduce the size of the drawing. Fig. 11 is a vertical sectional view, with parts broken away, of the forward pair of feed rolls, and showing the manner of heating the same. Fig. 12 is a fragmentary side elevation of the shearing mechanism and tripping devices, parts, however, being broken away and shown in section in order to more clearly bring out details of construction. Fig. 13 is a similar sectional view of that part of the machine shown in Fig. 12. Fig. 14 is a fragmentary longitudinal section of the front end of the machine and showing the manner of conveying the blanks delivered from the snatch rolls. Fig. 15 is a detail sectional view of the clutch mechanism. Fig. 16 is a detail view showing the manner of throwing the clutch into and out of operative position. Figs. 17 and 18 are detail views showing the manner of mounting the supply rolls.

Referring to the drawings, 1 designates a base support for the machine, upon the front end of which are mounted a plurality of upright frame standards 2, 3 and 4, arranged in transversely opposite pairs and carrying at their upper end an inclined frame 5 upon which are mounted the supply rolls 6. As shown in Fig. 2, the frame 5 is inclined upwardly toward its rear end, in order to more readily draw the webs of stock from the rolls. The front end of the machine is similarly provided with transversely extending standards 7, 7, upon the upper ends of which are mounted a longitudinal extending bed frame 8. Between the frames 5 and 8 are mounted upright standards 9 carrying the paste applying mechanisms hereinafter more particularly described. Preferably the standards 9 are provided with brace supports 10 secured at one end to the standards 9 and at their other to the frame member 5.

Describing now more particularly the supply rolls, each is mounted upon a suitable shaft or roller 11, seated in semi-circular bearings 12 carried by the opposite sides of frame 5. The rollers are adjustable endwise in order to bring the various rolls into exact alinement with each other. To this end the shaft 11 is provided at one end with a channeled collar 13, in which is seated a divided bearing ring 14, the two parts of which are locked together by a hand screw 15 extending through opposite ears 16. The lower end of the locking ring 14 is provided with an eye 17 through which extends an adjusting screw 18. The latter is mounted in a right angled bracket 19 secured as shown at 20 to the frame 5 and provided with a hand wheel 21 in order that it may be more readily operated. The channeled collar 13 is keyed to the shaft 11 by means of a key pin 22 extending through an enlargement 23 upon the outer end of the shaft 11.

In the drawings, only three supply rolls 6 are shown, but it is apparent that as many rolls may be mounted upon the frame 5 as are desired. In order to guide the webs as they are drawn from the supply rolls, we provide a plurality of confining rollers 24 extending transversely of the machine and journaled in suitable brackets 25 affixed to the lower side of the supporting frame 5. To the rear end of the frame 5 is secured a pair of standards 29 to each of which is fixed a series of superposed journal brackets 28. Between each pair of brackets is loosely journaled a guide roll 27 around which are trained the webs of stock. The lowermost web, however, is trained around a roller 30 journaled at either side in a forked arm 30'. The latter is in turn pivotally mounted on the main frame as shown at 30'' and is provided at its forward end with an extension 31' carrying a counter weight 32'. The arrangement is such that the tension of the roller upon the web can be adjusted by shifting the counter weights 32' along the extension 31'. From the foregoing arrangement it will be seen that any number of supply rolls may be used and a blank of any desired number of ply formed without necessitating any substantial change in the arrangement of the supply rolls.

Describing now the manner of applying the paste to the webs, the standards 9 are each provided with a plurality of forwardly extending brackets 32. Between each pair of brackets is supported a paste trough or fountain 33, to each of which paste or glue is fed through suitable pipes 34, 34 leading from any suitable source of supply. In the upper edge of each trough is journaled a fountain roll as 35, 36 and 37 respectively, the lower side of which dips into the supply of glue or paste, and the upper side of which serves as a support over which the web of card-board is drawn.

Inasmuch as it is only necessary to apply paste or adhesive to one each of the meeting surfaces of the several webs, no paste-applying mechanism is provided for the lowermost web. This latter is drawn across a guide roll 38 journaled in a bracket casting 39 mounted upon the base support as shown at 40. The fountain rolls are each provided with journal extensions 50 on which are mounted brackets 41, 42, 42' and 43 respectively. These sprockets are intergeared by means of sprocket chains 44 and 45, and the uppermost spindle 50 is provided with a sprocket 46 driven by a sprocket chain 47 leading to a countershaft not shown.

In order to tighten the webs of card-board before they pass to the gathering rolls hereinafter described, we provide a plurality of stretching rolls 48. Each of these rolls is journaled between a pair of arms 51 as shown at 49. The rear end of each of these arms is pivotally mounted as shown at 52 and carries a segmental gear 53. Each of these segments 53 is actuated by a ratchet 54 pivotally mounted at 55 to an extension of the bracket 32. Each ratchet 54 is provided with a lever arm 56 and handle 56', and is locked in adjusted position by means of a pawl 54' as shown.

As a feature of the present invention means are provided for heating the paste before it is applied to the webs. To this end, each fountain is provided with a heating chamber or steam chest 59 which extends transversely of the machine and directly beneath the fountains as shown more clearly in Fig. 6. Each heating chamber is supplied with steam from the main pipe 60 and branch pipes 61, delivering into the chamber as shown at 62. In order to further supply heat to the chambers and more effectively regulate the temperature therein, each is provided with a closed steam coil 64. One end of each coil leads to a branch inlet pipe 65 connected to the main supply pipe by a T union 66. The opposite end of the coil is connected to a branch exhaust pipe 67 leading to a common exhaust 68. The supply of steam to the chambers and steam coils may be regulated by any suitable valve mechanisms as 68'. In case a blank of only 3 ply is desired the upper roll is not used and accordingly the steam is cut off from its steam chamber 59. The exhaust pipe may also be cut off from this chamber by means of a valve 69'. In order to apply the paste uniformly to the rolls, the latter are provided with any suitable scraper mechanisms 70', mounted in brackets 72' and adjustable to and from the rolls by means of set screws 71'.

Referring now to the front end of the machine, upon suitable standards 76 is mounted a table 74, which extends across the frame and supports the blanks as they are fed across the machine. At either side of this table upon the frame 8 is mounted a series of brackets 75 in each of which is journaled one end of a pair of coöperating rolls. The lower rolls project through the face of the table, and the latter is, of course, suitably apertured for this purpose. As a feature of the present invention each pair of rolls are held yieldably in engagement with each other by means of coiled expansion springs 77' seated in the upper end of the brackets 75 and bearing against the upper member of each pair of rolls. The tension upon the spring may be regulated by means of a screw 77, controlled by a hand wheel 78 and locked in position by means of a screw 79.

The webs of stock after they leave the gluing mechanism are carried to the gathering rolls 80 and 81. These rolls are manually controlled by means of a hand wheel 82 mounted upon an extension 83 of the journal bearing of the lower roll 81. The upper roll is driven by means of a gear 84 meshing with a gear 85 carried by the shaft 83. From the gathering rolls, the webs of stock pass to the pressing rolls 86, of which there are three sets in the present instance. From the latter the multi-ply web passes into the forward pair of feeding rolls 87, and thence to the slitting rolls 88. Each slitting roll has a cylindric presser body 89, and at one end thereof a peripheral radial extending shearing flange 90; the shearing flanges of the pair being oppositely beveled and arranged to overlap, and the lower roll being provided with a circumferential groove to receive the shear flange of the opposing roll. The rolls are adjustable longitudinally upon their respective shafts in order to enable the web to be slitted into strips of any desired width. The upper member of the slitting rolls is adjustable relative to the lower member by means of a screw 91 controlled by a hand wheel 92 and lock nut 93.

At the front of the slitting rolls are mounted a second pair of feed rolls 94 and 95. These rolls, however, are kept heated in order to more effectively glue the webs together. To this end, in each end of the rolls 94 and 95 is seated a plug or closure member 103 screw threaded into the roll as shown at 104 and locked in position by means of screw bolts 105. Each of these plugs is apertured to receive a stub shaft 96 journaled in the respective supporting brackets 75. The upper shafts 96 are centrally bored as shown at 97 and 98, and the lower shafts are similarly bored as shown at 99, 99' respectively. With the bore 97 is connected a steam inlet pipe 101, and with the bore 99 is connected an exhaust pipe 102. The steam passes from the upper roll to the lower one through the bores 98 and 99 and a branch coupling member 100.

From the front feed rolls the web passes to the shearing mechanism, which is constructed as follows: At either side of the frame 8, is mounted a standard 106 provided with vertically extending ways 107, between which is arranged to slide a shear bar 108. With each end of this shear bar is connected an eccentric rod 109', which extends downwardly to and connects with an eccentric 109, mounted upon a cross shaft 110 journaled in the main frame. This shear bar 108 is provided with a shear blade 111, the lower cutting edge of which coöperates with a fixed shear blade 112 mounted upon a cross supporting bracket 113, and having its upper edge approximately flush with the table. The eccentric shaft 110 is actuated in the following manner: Upon one end of this shaft is loosely mounted a belt pulley 114 which is continuously driven by a belt 115. Within the hub of this pulley is mounted an internal gear or ratchet 117 and adjacent the hub is keyed upon the shaft a clutch member 118, which has mounted in a recess 119 in its face, a dogging pawl 120. The pawl is provided with an offset portion 121 which extends within the internal ratchet 117 and acts as a pawl to engage the latter. The main body of the pawl extends outwardly beyond the periphery of the clutch wheel and normally engages the lower end of a detent 122 which is pivoted as indicated at 123 upon a fixed part of the frame structure, and is adapted to be lifted by shipping rod 124 carrying a stud 125 which engages the detent. When the pawl is thus engaged with the detent and forced back against the front wall of the recess in which it is pivoted, it is held out of engagement with the teeth of the ratchet 117 by means of a coiled expansion spring 126 arranged to act thereon. Inasmuch as the pulley 114 is constantly rotating, the eccentric shaft is thus brought into operation to draw down the shear blade.

In order to arrest the eccentric shaft automatically at the end of each rotation a stud or projection 127 is provided upon the clutch member in position to engage the lower curved end of the shipping rod cam fashion. The arrangement of the parts just described is such that in the forward rotation of the clutch member the shipping rod is depressed and restored to its normal position after which the stud passes out of engagement with the shipping rod, a latch member now to be described serving to retain the shipping rod in its normal position. The shipping rod having been depressed the detent 122 engages the pawl 120 as it comes around and forces it backwardly and out of engagement with the ratchet, thus automatically arresting the shaft. In this connection it will be noted that the lower end of the shipping rod is provided with a curved extension 129 which engages the hub 118' of the clutch member and limits the rising movement of the rod.

In order to more accurately cut the material, means are provided for clamping the web of material and holding it immovable while the shears are cutting. To this end a clamping bar 128 is mounted to reciprocate in suitable guide-ways just above the bed plate and is adapted to coöperate with the fixed bar 113 heretofore described. With each end of the clamping bar 128 is connected a strap link 130 extending down the outer side of the frame. The lower ends of these links 130 are connected by a cross rod 131 carrying at either side a cam lever 132 having a forked extension 133 which engages the shaft 110. Each cam lever is provided with a roller 134 which rides in a suitable cam groove 135. The arrangement is such that the clamp 130 will descend and grip the web just in advance of the shear blade and hold it clamped during the full stroke of the latter. The clamping bar is positively returned to normal by means of the cam rollers 134.

Describing now the tripping mechanism which sets in motion the shear actuating mechanism to sever blanks of predetermined lengths, in suitable standards 137 are mounted snatch rollers 139. In one standard 137 is journaled a transversely extending shaft 140, one end of which is provided with a tripping finger 141 which is normally held in upright position, as shown in Fig. 13 by means of a counterweight 142 adjustably mounted upon the rod 143 fixed to the shaft 140. A trip rod 145 is operatively connected to the shaft 140 by means of a link or lug 144 as shown more clearly in Fig. 12. The trip rod extends forwardly to the point adjacent the shipping rod and there is pivotally connected as shown at 146 to one arm of a double armed lever 147 pivoted to the main frame as shown at 148. The other arm of this lever 147 operatively engages one arm of a V-shaped detent 150. The lower arm 151 of the detent engages a notch 152 in the shipping rod, and holds the latter depressed against the tension of a coiled expansion spring 153 interposed between a collar 154 fixed to the upper end of the shipping rod and a suitable bracket 155. The arm 151 of the detent is held in engagement with the notch 152 by means of a counterweight 156. The arrangement just described is such that when the tripping rod is shifted forwardly toward the shipping rod, the trip first forces the detent out of engagement with the shipping rod permitting the latter to rise and thereafter slips past the end of the detent so that the latter may be thrown back into engagement with the notch of the shipping rod as soon as the latter is again depressed and before the tripping rod returns to its normal position. This is insured by reason of the fact that the advancing blank will hold the finger 141 depressed until it has passed beyond the snatch rolls 139. In the rear of the rolls 139 are mounted delivery rolls 138 journaled in similar standards 136.

Above the shaft 140 is mounted a similar shaft 157 carrying a normally downwardly extending finger 158 at the front of the snatch rolls 139. One end of this shaft 157 is provided with a lever arm 159, to which is connected the lower arm 160 of a bell crank 161. The latter is operatively connected to any suitable tallying mechanism 162 mounted upon the upper end of the adjacent standard 137. The connection is such that the tallying mechanism will register once every time the finger 158 is actuated by the advancing blank.

In order to cut the cardboard into blanks of any desired length, the standards 136 and 137 are mounted upon suitable bed plates 163. These latter are adjustably mounted upon rack bars 164 secured to the front end of the main frame. Between the standards 136 and 137 is mounted a shaft 166, each end of which is provided with a gear 167 which meshes with the corresponding rack bar and is manually controlled by means of hand wheel 168. In order to convey the blanks from the shearing mechanism to the snatch rolls, we provide an apron 169, one end of which is connected to a roller 170 mounted between the standards 137 and the other end of which is wound around a similar roller 171 secured to the standards 106. The roller 171 is locked against rotation by means of manually controlled pawls 172. The apron may be lengthened or shortened by simply releasing the pawls and unwinding the apron in an obvious manner.

After the blanks pass through the snatch rolls they fall upon the traveling carrier 173 one end of which is trained around a roller 174 and the other around a similar roller 175. The latter is provided with journal extensions 176 mounted in bearing blocks 177. The latter are adjustably seated in guideways 178 formed in the inner sides of the main frame. The bearing blocks are controlled by means of screws 179 and hand wheels 180 as shown more clearly in Fig. 14. From the traveling conveyer 173 the blanks are transferred to an endwise conveyer belt 181 whereby they may be carried to the stack room.

Referring now to the manner of actuating the various mechanisms described, the forward pair of feed rolls 87 are geared together by means of gears 182, 183 and positively driven from a main sprocket wheel 184 having a sprocket belt 185 leading to the main driving shaft. The slitting rolls are also provided with intermeshing gears 186, 187 and the front pair of feed rolls with somewhat similar gears 188 and 189. These gears are operatively connected to the main sprocket wheel by means of relatively large spur gears 190, 191 and an intermediate gear 192. The gears 190, 191 are mounted upon cross shafts 193 extending transversely of the frame as shown more clearly in Fig. 10.

The respective pairs of presser rolls 86 are provided with intermeshing sprockets 194, 195 and are operatively connected to the main sprocket 184 by means of sprocket chains 196, as shown in Fig. 3. The traveling conveyer 173 is similarly driven by means of a sprocket chain 197, one end of which extends around a suitable sprocket upon the shaft 176 and the other end of which is similarly secured to an idler shaft 198. The latter is in turn driven by means of a sprocket chain 199, the forward end of which is mounted upon a sprocket 200 secured to an extension 201 of the lower feed roll 87. The snatch rolls 139 are driven by means of intermeshing gears 201, 202, the latter of which is mounted upon a stub shaft 203 carrying a similar gear (not shown) around which is trained a sprocket belt 205. One end of this belt is trained around an idler shaft 204, and the other around the shaft 198 which is driven by the sprocket belt 199 as heretofore described. As shown in Fig. 13, the upper lap 205' of the chain 205 is held taut by means of a tightening roll 206 pivotally connected to the stub shaft 203. This arrangement of the sprocket belt 205 permits of the snatch rolls and connected mechanism being bodily shifted without readjusting the sprocket chain. It will be noted that the rolls 139 are driven at a considerably higher rate of speed than the peripheral speed of the feed rolls, the object being to have the former act as snatch rolls which will rapidly run the severed blank and deliver it to the idler rolls 138.

The operation of the various parts will be apparent from the foregoing description and need not be described in detail. It is to be noted, however, that the tripping and tallying mechanisms are positively controlled by means of the advancing end of the severed blanks and that the length of the latter may be varied by simply shifting the standards carrying the rolls 138 and 139. The adjustable mountings of the upper members of the various rolls permits of the webs of stock being subjected to any desired pressure while they are being glued together.

The particular manner of heating the paste and feed rolls may be varied or altogether dispensed with if desired.

We claim as our invention:

1. The combination with a main frame, of means for feeding a web of stock over said main frame, automatic shear mechanism, adjustably mounted tripping mechanism controlling said shear mechanism and adapted to be actuated by the advancing end of the web, and an extensible carrier for conveying the web from the shear mechanism to the tripping mechanism.

2. The combination with a main frame, of means for feeding a web of stock over said main frame, cutting off shear mechanism, comprising a pair of shear blades between the cutting edges of which the web is fed, actuating mechanism for operating said shear mechanism, adjustably mounted tripping mechanism controlling said actuating mechanism and operated by the advancing end of the web, and a flexible carrier for conveying the web from the shear mechanism to the tripping mechanism, and means for varying the length of said carrier.

3. The combination with a main frame, of means for feeding a web of stock over said main frame, severing mechanism, actuating mechanism for operating said severing mechanism, tripping mechanism controlling said actuating mechanism and operated by the advancing end of the web, a flexible carrier for conveying the web from the severing mechanism to the tripping mechanism, and means for varying the length of said carrier.

4. The combination with a main frame, of continuously moving feed mechanism for carrying a web of stock over said main frame, vertically disposed shear members, a tripping finger pivotally mounted in advance of said shear mechanism and adapted to be actuated by the advancing web, a pair of snatch rolls mounted in front of the shear mechanism, operative connections between the tripping finger and shear mechanism, and a vertically reciprocatory clamping member for holding the web against movement during the operation of shearing.

5. In a machine for making cardboard blanks, the combination with a main frame, of means for feeding a web of stock horizontally over said frame, vertically extending opposed shear members, tripping mechanism mounted in advance of the shear members and actuated by the advancing end of the web, mechanism for operating said shear mechanism, operative connections between said latter mechanism and said tripping mechanism, and means for clamping said blank during the operation of shearing.

6. In a machine for making cardboard blanks, the combination with a main frame, of means for feeding a web of stock over said frame, severing mechanism, a pair of snatch rollers mounted in advance of said severing mechanism, a tripping finger mounted adjacent thereto and actuated by the advancing end of the web, means for actuating said severing mechanism, and operative connections between said means and said tripping finger.

7. In a machine for making cardboard blanks, the combination with means for continuously and uninterruptedly feeding a web of stock over said frame, of a pair of vertically mounted shear members, a tripping finger controlling said shear mechanism and mounted in advance of the latter and operated by the advancing end of the web, means for momentarily arresting the movement of the forward end of the web during the operation of cutting, and snatch rollers for receiving the forward end of the severed blank.

8. In a machine for making cardboard blanks, the combination with a main frame, of means for feeding the web of stock horizontally across said frame, a stationary shear member, a movable shear member coöperating therewith, a clamping member associated with said movable shear member, a pair of snatch rollers mounted in advance of the shear members, a pivotally mounted tripping member actuated by the advancing end of the web, an eccentric member for operating the movable shear member and clamping member, operative connections between said eccentric member and tripping finger.

EMMONS W. BONFIELD.
JAMES E. FELLOWS.

Witnesses:
FRANK L. BELKNAP,
ANNA O'BRIEN.

---

Copies of this patent may be obtained for five cents each, by addressing the "Commissioner of Patents, Washington, D. C."